(12) United States Patent
Niu

(10) Patent No.: US 8,308,289 B2
(45) Date of Patent: Nov. 13, 2012

(54) LEAF SPRING HINGES FOR EYEGLASSES

(75) Inventor: Shouye Niu, Shenzhen (CN)

(73) Assignee: Promisewell Company Limited, Hong Kong (HK)

( * ) Notice: Subject to any disclaimer, the term of this patent is extended or adjusted under 35 U.S.C. 154(b) by 154 days.

(21) Appl. No.: 12/868,734

(22) Filed: Aug. 26, 2010

(65) Prior Publication Data

US 2011/0051075 A1    Mar. 3, 2011

(30) Foreign Application Priority Data

Aug. 31, 2009    (CN) .......................... 2009 1 0189798

(51) Int. Cl.
*G02C 5/22*    (2006.01)

(52) U.S. Cl. ............................ 351/153; 351/113; 16/228
(58) Field of Classification Search .................. 351/119, 351/121, 153, 113, 114; 16/228
See application file for complete search history.

(56) References Cited

U.S. PATENT DOCUMENTS

| 7,344,242 B2 * | 3/2008 | Habermann | .................. 351/156 |
| 7,484,844 B2 * | 2/2009 | Spandl | .......................... 351/153 |

* cited by examiner

Primary Examiner — Huy K Mai

(57) ABSTRACT

A leaf spring hinge comprising a leaf spring member that is integrally formed with or fixedly connected to a lug or a temple is provided. The leaf spring member is provided at least with a leaf spring suspended and bent from a base. The leaf spring is bent in the form of an R-letter or U-letter. The leaf spring hinge has simple structure and reliable resilience, and is solid, durable and easy to manufacture.

4 Claims, 4 Drawing Sheets

US 8,308,289 B2

LEAF SPRING HINGES FOR EYEGLASSES

CROSS-REFERENCE TO RELATED APPLICATIONS

The present application claims priority from Chinese patent application No. 200910189798.8, entitled LEAF SPRING HINGES FOR EYEGLASSES and filed in the name of Elegance Eyeglasses Factory on Aug. 31, 2009. The entire content of the application is herein incorporated by reference.

TECHNICAL FIELD OF THE INVENTION

The present invention relates to a kind of leaf spring hinges used for eyeglasses.

BACKGROUND OF THE INVENTION

U.S. Pat. No. 5,959,715 to Jaffelin disclosed a resilient hinge for spectacle frames. The resilient hinge comprises a male or female knuckle fixed to the end of a frame lug which extends in a direction, and an arm substantially in the extension of the lug and abutting against the lug when the arm is in its normal open position, wherein the inner side of the arm is connected to the knuckle by means of a rigid return device (i.e., a leaf spring) which can rotate freely about the knuckle and operate by bending. The resilient hinge comprises the leaf spring as a resilient element, and the leaf spring is connected to the temple of the eyeglasses through a swivel pin such as in the form of rivet pin.

U.S. Pat. No. 6,336,250 B1 to Kinji et al. disclosed a spring hinge for eyeglasses. The spring hinge comprises a spring member provided on the inside of the temple of the eyeglasses. The spring member is an independent arc-shaped plate with an insertion hole. An intermediate connecting member constitutes the front end portion of the temple and the spring member is installed in a free groove formed by two protrusions.

These hinges employing leaf spring as resilient elements require lots of accessories and have incompact arrangements.

SUMMARY OF THE INVENTION

An object of the present invention is to provide a leaf spring hinge for eyeglasses which enables a leaf spring and a temple or a lug to form integrally and has a reliable resilience and simplified structure.

To achieve the above object, it is provided a leaf spring hinge comprising a leaf spring member integrally formed with or fixedly connected to a lug or a temple, wherein the leaf spring member itself is provided at least with a leaf spring suspended and bent from a base.

In another embodiment, the leaf spring member is provided with a leaf spring that is suspended from a base and bent in the form of an R-letter or U-letter, and a female knuckle that is extended upward in a vertical direction from two sides of the leaf spring, bent in the form of a U-letter and provided with an unthreaded hole and a threaded hole.

In another embodiment, the leaf spring member of the present invention is consisted of a leaf spring that is suspended from a base and bent in the form of an R-letter or U-letter, a first rectangular through hole formed in a front portion of the leaf spring, and a second rectangular through hole formed in a portion of the base corresponding to the front portion of the leaf spring, when the leaf spring is in a bent state, the first and second rectangular through holes being aligned.

In another embodiment, the leaf spring member of the present invention is consisted of a leaf spring that is bent from a base and in the form of an R-letter or U-letter.

In another embodiment, the leaf spring member of the present invention is consisted of a leaf spring that is bent from a base and in the form of an R-letter or U-letter, and cuts symmetrically formed in a front portion of the base.

Compared to the conventional techniques, the present invention has advantages such as simple structure, easy to manufacture, reliable resilience, solid and durable.

DETAILED DESCRIPTION OF THE INVENTION

The present invention will now be described in greater detail with reference to the accompanied drawings.

FIGS. 1 to 5 show the first embodiment of the present invention.

Figure 1:
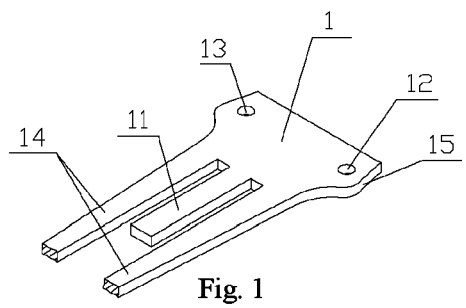
FIG. 1 is a developed representation of a leaf spring member according to the first embodiment of the present invention.
Figure 2:
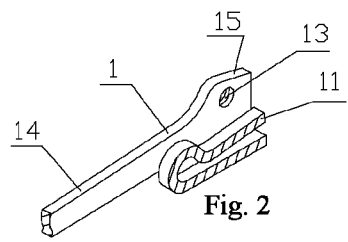
FIG. 2 is a sectional view of the leaf spring member according to the first embodiment of the present invention.
Figure 3:
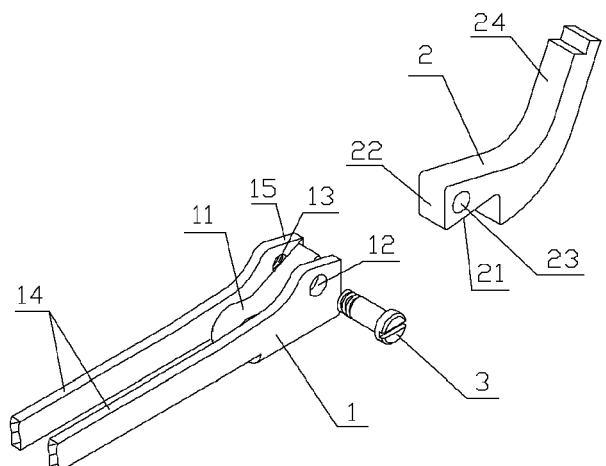
FIG. 3 is an exploded view of a leaf spring hinge according to the first embodiment of the present invention.
Figure 4:
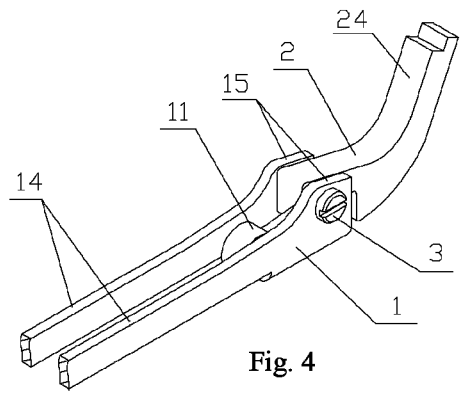
FIG. 4 is an assembly drawing of the leaf spring hinge according to the first embodiment of the present invention.

With reference to FIG. 1, an unfolded leaf spring member 1 is preformed to comprise an elongate leaf spring 11, a temple 14, a female knuckle 15 and holes for processing into an unthreaded hole 12 and a threaded hole 13. As shown in FIGS. 1 and 2, the temple 14 of the leaf spring member 1 is formed to be very long. The temple 14 in this example is a complete one and integrally formed with the leaf spring member 1.

Figure 5:
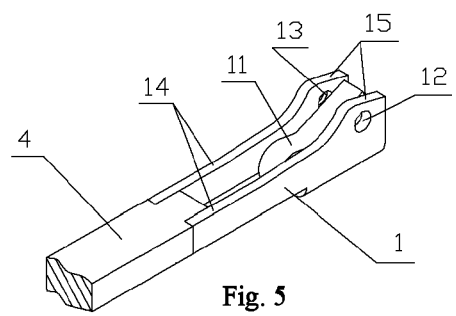
FIG. 5 is a schematic view showing the combination between the leaf spring member according to the first embodiment of the present invention and a temple.
Figure 6:
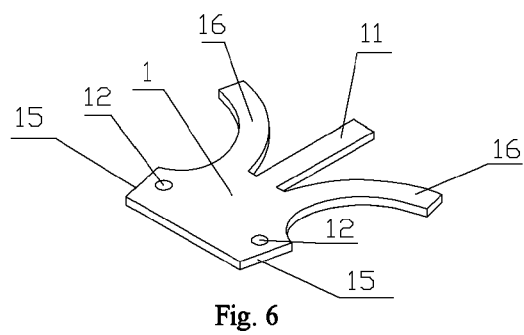
FIG. 6 is a developed representation of a leaf spring member according to the second embodiment of the present invention.
Figure 7:
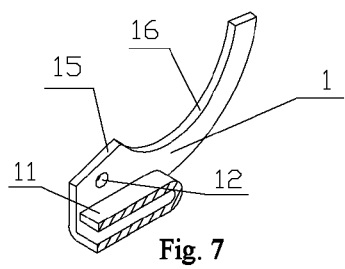
FIG. 7 is a sectional view of the leaf spring member according to the second embodiment of the present invention.
Figure 8:
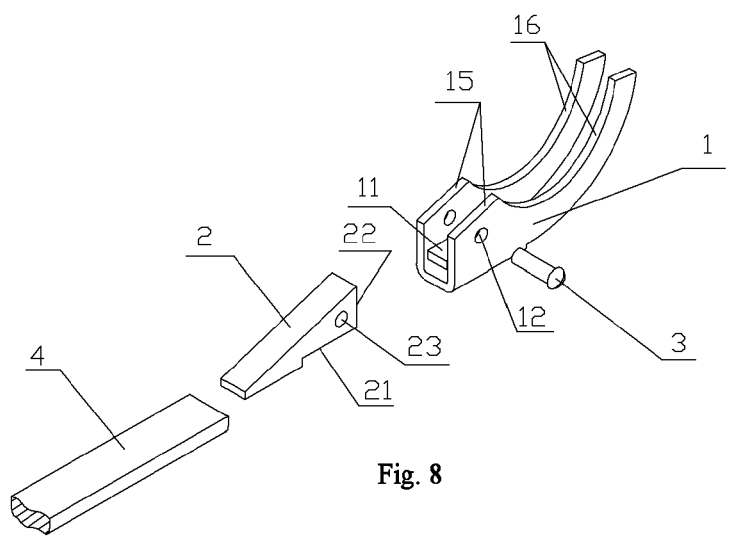
FIG. 8 is an exploded view of a leaf spring hinge according to the second embodiment of the present invention.
Figure 9:
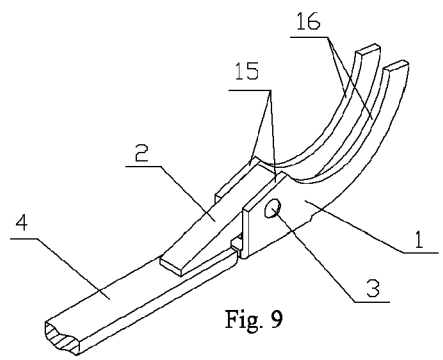
FIG. 9 is an assembly drawing of the leaf spring hinge according to the second embodiment of the present invention.

Alternatively, as shown in FIG. 5, the temple 14 may be formed to be very short. In this case, another temple 4 which is an independent member is connected to the temple 14 by, for example, welded connection, rivet connection or bolt connection.

With reference to FIGS. 1 to 5, the spring hinge for eyeglasses in this example comprises a leaf spring member 1, an actuating device 2 and a pivot element 3. The leaf spring member 1 is integrally formed with the temple 14 or fixedly connected to the temple 4. The leaf spring member 1 has a single-arm leaf spring 11 bent in the form of an R-letter or U-letter, and a female knuckle 15 extended upward in a vertical direction from two sides of the leaf spring 11 and bent in the form of a U-letter. An unthreaded hole 12 is formed on one protrusion of the knuckle 15, and a threaded hole 13 is formed on the other protrusion of the knuckle 15. The actuating device 2 is a male knuckle and integrally formed with a lug 24. In normal position, surface 21 or 22 of the actuating device 2 abuts against the leaf spring 11. The pivot element 3 is a screw.

FIGS. 6 to 9 show the second embodiment of the present invention.

In this example, the spring hinge for eyeglasses comprises a leaf spring member 1, an actuating device 2 and a pivot element 3. The leaf spring member 1 is integrally formed with a lug 16. The leaf spring member 1 has a single-arm leaf spring 11 bent in the form of an R-letter or U-letter, and a female knuckle 15 extended upward in a vertical direction from two sides of the leaf spring 11 and bent in the form of a U-letter. Two unthreaded holes 12 are each formed on respective protrusion of the knuckle 15. The actuating device 2 is a male knuckle in the shape of a wedge and having a through hole 23. The device 2 is integrally formed with or fixedly connected to a temple 4. In normal position, surface 21 or 22 of the actuating device 2 abuts against the top surface of the leaf spring 11. The pivot element 3 is a rivet.

Figure 10:
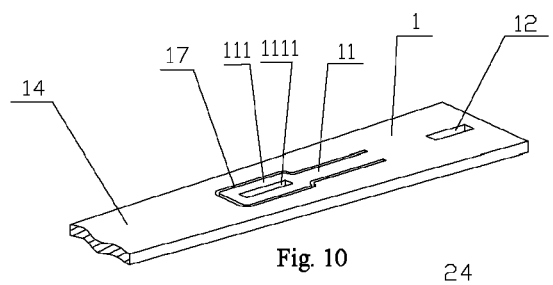
FIG. 10 is a developed representation of a leaf spring member according to the third embodiment of the present invention.
Figure 11:
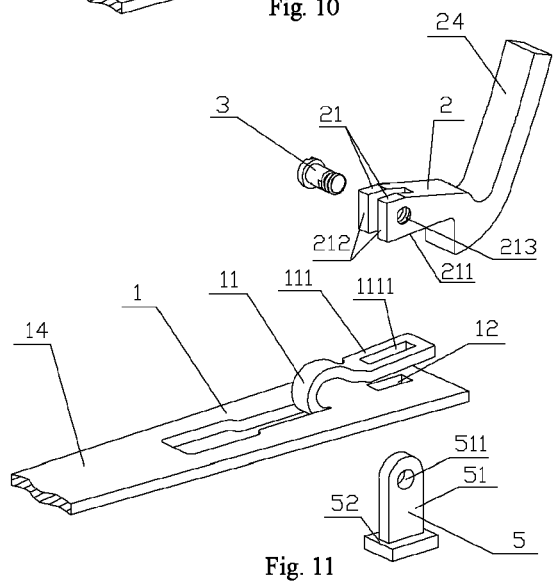
FIG. 11 is an exploded view of a leaf spring hinge according to the third embodiment of the present invention.
Figure 12:
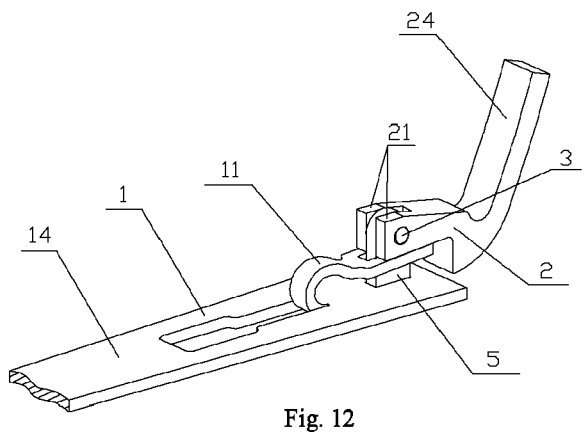
FIG. 12 is an assembly drawing of the leaf spring hinge according to the third embodiment of the present invention.

FIGS. 10 to 12 show the third embodiment of the present invention.

With reference to FIG. 10, an unfolded leaf spring member 1 is integrally formed with a temple 14. The member 1 is preformed to include an elongate leaf spring 11 which is connected to a base at one edge and separated from the base by a gap 17 at other edges. The leaf spring 11 has a relatively wider portion 111 with a rectangular hole 1111 formed thereon. Another rectangular hole 12 is formed in the front portion of the base.

With reference to FIGS. 11 and 12, the spring hinge for eyeglasses comprises a leaf spring member 1, an actuating device 2, a male knuckle 5 and a pivot element 3. The member 1 is integrally formed with a temple 14. The member 1 has a single-arm leaf spring 11 bent in the form of an R-letter or U-letter. The front portion of the leaf spring 11 is relatively wider and has a rectangular hole 1111 formed thereon. When the leaf spring 11 is bent in the form of an R-letter or U-letter, the rectangular hole 1111 is aligned with the rectangular hole 12 formed in the front portion of the base. The male knuckle 5 comprises a flat insertion end 51 and a base portion 52, with a through hole 511 formed in the flat insertion end 51. The flat insertion end 51 insert through the rectangular hole 12 formed in the front portion of the base into the rectangular hole 1111 formed in the front portion of the leaf spring 11. The actuating device 2 is in the form of a female knuckle that is integrally formed with a lug 24. The head portion of the female knuckle 2 is provided with a groove with two flat protrusions 21 serving as walls of the groove. The protrusions 21 have side surfaces 211 and 212, a through hole (not shown) and a threaded hole 213. The pivot element 3 is a screw. When assembled, the side surface 211 abuts against the top surface of the portion 111 of the leaf spring. When the actuating device 2 is actuated, the contact surface between the device 2 and the leaf spring 11 can be switched from surface 211 to surface 212.

Figure 13:
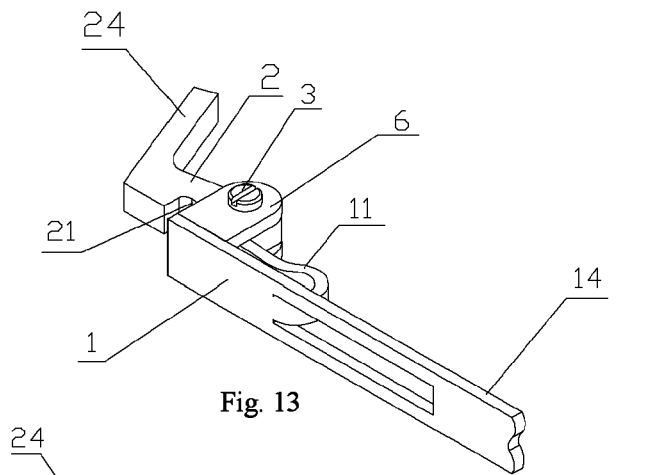
FIG. 13 is an assembly drawing of a leaf spring hinge according to the fourth embodiment of the present invention.
Figure 14:
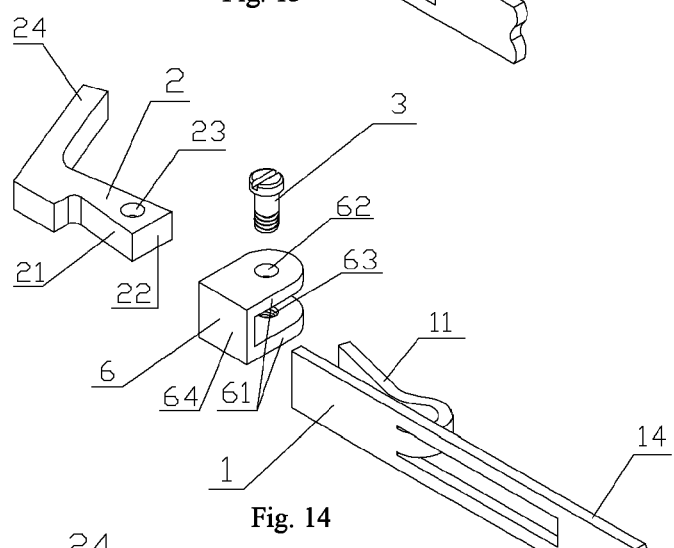
FIG. 14 is an exploded view of the leaf spring hinge according to the fourth embodiment of the present invention.

FIGS. 13 and 14 show the fourth embodiment of the present invention.

With reference to FIGS. 13 and 14, in this example, a leaf spring hinge for eyeglasses comprises a leaf spring member 1, an actuating device 2, a female knuckle 6 and a pivot element 3. The leaf spring member 1 is integrally formed with a temple 14 and provided with a leaf spring bent in the form of an R-letter or U-letter. The actuating device 2 is in the form of a male knuckle and integrally formed with a lug 24. The female knuckle 6 has a flat bottom surface 64 and a groove with two protrusions 61 being the walls of the groove. The protrusions 61 are formed with an unthreaded hole 62 and a threaded hole 63. The bottom surface 64 is fixedly connected to the leaf spring member 1 by soldering. In normal position, a surface 21 or 22 of the actuating device 2 alternatively abuts against the leaf spring 11 of the leaf spring member 1. The pivot element 3 is a screw.

Figure 15:
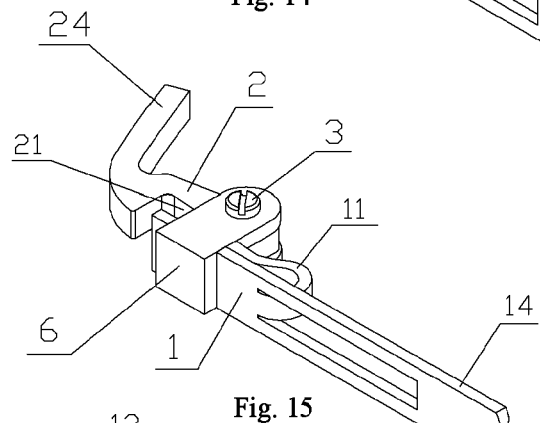
FIG. 15 is an assembly drawing of a leaf spring hinge according to the fifth embodiment of the present invention.
Figure 16:
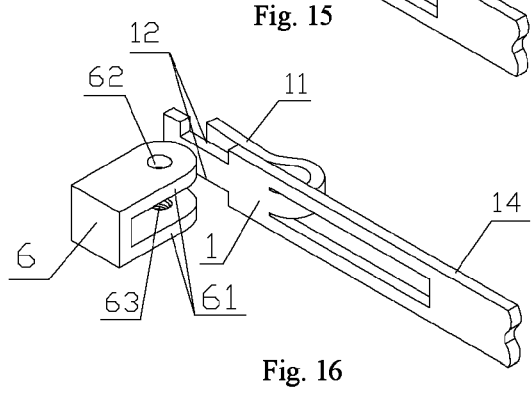
FIG. 16 is a partial exploded view of the leaf spring hinge according to the fifth embodiment of the present invention.

FIGS. 15 and 16 show the fifth embodiment of the present invention.

In this example, a leaf spring hinge for eyeglasses comprises a leaf spring member 1, an actuating device 2, a female knuckle 6 and a pivot element 3. The leaf spring member 1 is integrally formed with or fixedly connected to a temple 14 and provided with a leaf spring bent in the form of an R-letter or U-letter. The actuating device 2 is in the form of a male knuckle and integrally formed with a lug 24. The female knuckle 6 has a groove with two protrusions 61 being the walls of the groove. The protrusions 61 are formed with an unthreaded hole 62 and a threaded hole 63. Two cuts 12 are symmetrically formed in a front portion of the leaf spring member 1. The female knuckle 6 can be engaged with the leaf spring member 1 by inserting the respective protrusion 61 of the female knuckle 6 into the respective cut 12 of the leaf spring member 1. The pivot element 3 is a screw.

The present invention is described only in reference to preferable embodiments. It should be noticed that, however, changes and modifications can be made to the present invention without departing from the scope of the invention as defined by the appended claims.

What is claimed is:

1. A leaf spring hinge comprising a leaf spring member integrally formed with or fixedly connected to a lug or a temple, wherein the leaf spring member is provided at least with a leaf spring suspended and bent from a base;

a first rectangular through hole is formed in a front portion of the leaf spring, and a second rectangular through hole is formed in a portion of the base corresponding to the front portion of the leaf spring, when the leaf spring is in a bent state, the first and second rectangular through holes being aligned.

2. The leaf spring hinge of claim 1, wherein the leaf spring is bent in the form of an R-letter or U-letter, and the leaf spring member is further provided with a female knuckle, the female knuckle being extended upward in a vertical direction from two sides of the leaf spring, bent in the form of a U-letter and provided with an unthreaded hole and a threaded hole.

3. The leaf spring hinge of claim 1, wherein the leaf spring member is consisted of the leaf spring bent in the form of an R-letter or U-letter.

4. The leaf spring hinge of claim 1, wherein the leaf spring member is consisted of the leaf spring bent in the form of an R-letter or U-letter, and cuts symmetrically formed in a front portion of the base.

* * * * *